Figure 4:
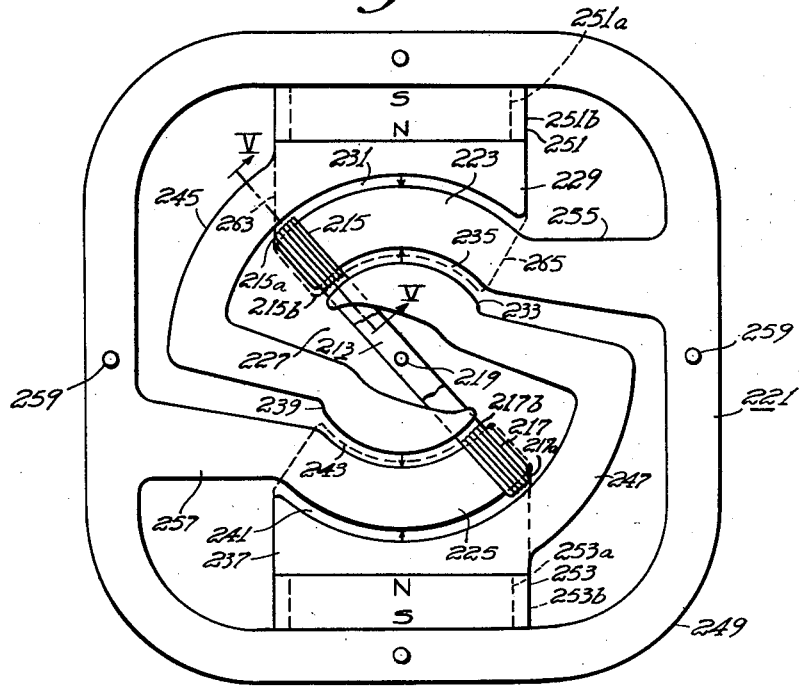

May 23, 1950  C. L. FREEDMAN  2,508,380
MOVING COIL ELECTRICAL MEASURING INSTRUMENT
Filed July 20, 1946  3 Sheets-Sheet 1
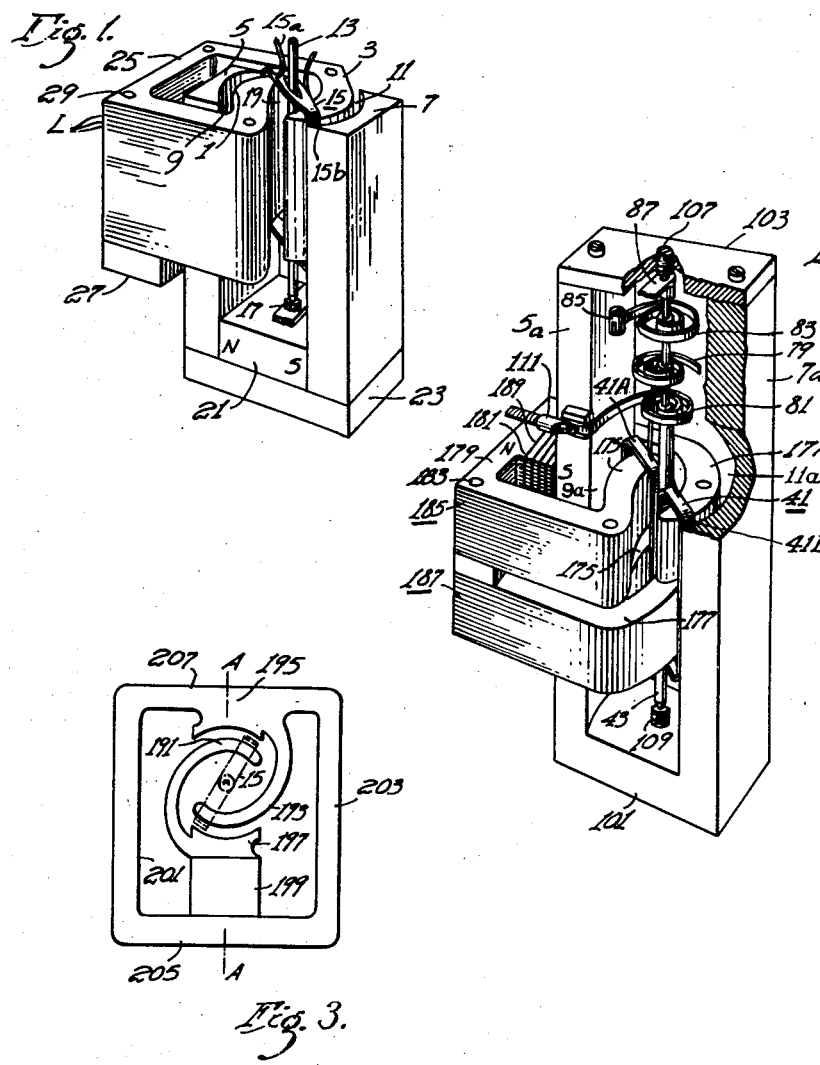
INVENTOR
Cecil L. Freedman.
BY
ATTORNEY May 23, 1950     C. L. FREEDMAN     2,508,380

MOVING COIL ELECTRICAL MEASURING INSTRUMENT

Filed July 20, 1946     3 Sheets-Sheet 2

WITNESSES:

INVENTOR
Cecil L. Freedman.
BY
ATTORNEY

May 23, 1950  C. L. FREEDMAN  2,508,380
MOVING COIL ELECTRICAL MEASURING INSTRUMENT
Filed July 20, 1946  3 Sheets-Sheet 3
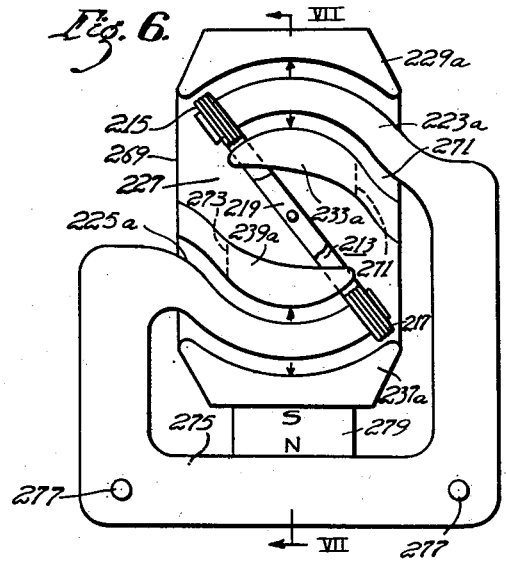
Fig. 6.
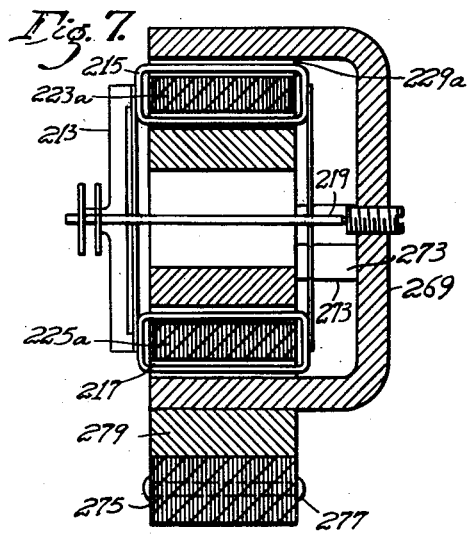
Fig. 7.
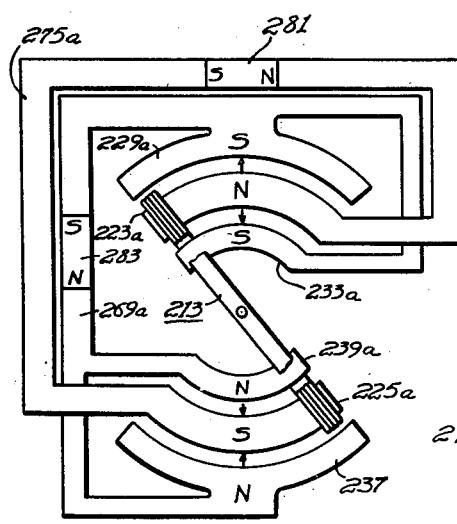
Fig. 8.
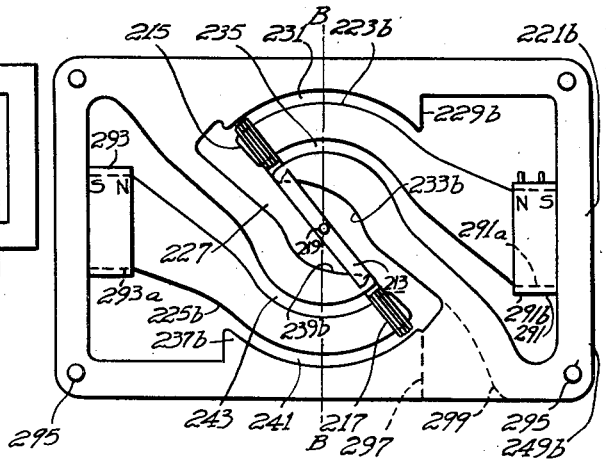
Fig. 9.
WITNESSES:
INVENTOR
Cecil L. Freedman.
BY
ATTORNEY Patented May 23, 1950

2,508,380

UNITED STATES PATENT OFFICE 2,508,380

MOVING COIL ELECTRICAL MEASURING INSTRUMENT

Cecil L. Freedman, Pittsburgh, Pa., assignor to Westinghouse Electric Corporation, East Pittsburgh, Pa., a corporation of Pennsylvania Application July 20, 1946, Serial No. 685,057

24 Claims. (Cl. 171—95)

This invention relates to electrical instruments, and it has particular relation to electrical instruments employing moving coils associated with magnetic structures for providing magnetic fields for the moving coils.

In electrical instruments, particularly those designed for measuring various electrical quantities, it is common practice to employ a coil mounted for rotation about an axis intermediate two sides of the coil. This coil is associated with a magnetic structure which provides a separate air gap for each of the two sides of the coil. In permanent-magnet, moving-coil instruments the magnetic structure includes a permanent magnet for establishing a magnetic field in each of the air gaps. In electro-dynamic instruments the magnetic structure has associated therewith a coil or winding which constitutes a source of magnetic flux for the air gaps. Instruments of the above types also are employed as electrical relays.

In most electrical instruments of the foregoing types the moving coil could be removed from operative relationship with respect to the associated magnetic structure and reinserted in operative relationship only by disassembling portions of the magnetic structure. Such a disturbance of the magnetic structure is objectionable for the reason that it is difficult to maintain uniform air gaps and in the case of permanent-magnet, moving-coil instruments, it is inconvenient to provide keepers for the permanent magnets in many cases.

In the copending applications of L. J. Lunas, Serial No. 570,028, filed December 27, 1944, and D. A. Young et al., Serial No. 570,029, filed December 27, 1944, electrical instruments of the foregoing types are povided with a novel pole piece assembly permitting removal and insertion of a moving coil relative to an associated magnetic structure without disturbing the magnetic structure in any way. As shown in these patent applications, inner and outer pole pieces are associated to provide air gaps for two sides of a moving coil.

In accordance with the present invention, the inner and outer pole pieces of the aforesaid patent applications may be employed, but the air gaps provided by the pole pieces are provided with magnetic flux furnished by a single source of magnetomotive force. The invention contemplates further the provision of an instrument wherein a magnetic structure provides air gaps for each of two sides of each of two spaced coils mounted for rotation relative to the magnetic structure about a common axis. The two sides of each coil may be disposed in different planes, and the magnetic structure is configured to permit removal of the coils from operative position relative to the magnetic structure without disturbing the magnetic structure.

It is, therefore, an object of the invention to provide an electrical instrument having a moving coil and having a magnetic structure establishing a pair of air gaps for the moving coil, with a single source of magnetomotive force for supplying magnetic flux to the air gaps.

It is a further object of the invention to provide an electrical instrument having a moving coil assembly and having a magnetic structure establishing two air gaps for sides of the moving coil assembly, with a single source of magnetomotive force for supplying magnetic flux to the air gaps in series.

It is an additional object of the invention to provide an electrical instrument having a moving coil detachably associated with the magnetic structure wherein the magnetic structure provides separate air gaps for two sides of the coil assembly and wherein a single source of magnetomotive force supplies magnetic flux to the air gaps in parallel.

It is also an object of the invention to provide an instrument having a moving coil assembly including two coils mounted for rotation about a common axis wherein a magnetic structure provides a magnetic field for each of two sides of each coil, and wherein the coil assembly may be removed from operative position relative to the magnetic structure without disturbing the magnetic structure.

Figure 5:
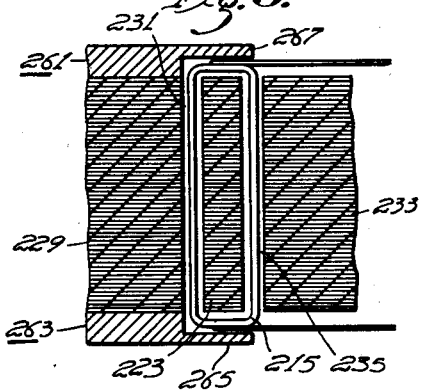

Other objects of the invention will be apparent from the following description taken in conjunction with the accompanying drawings, in which:

Figures 1 and 2 are views in perspective with parts broken away of various instruments embodying the invention, Figs. 3, 4, 6 and 9 are views in plan of further embodiments of electrical instruments incorporating the invention, Figs. 5 and 7 are sectional views taken on lines V—V and VII—VII respectively in Figs. 4 and 6, and Fig. 8 is a schematic view illustrating a further embodiment of the invention.

Referring to the drawings, Fig. 1 shows an electrical instrument having a magnetic structure which includes a pair of inner magnetic pole pieces 1 and 3 and a pair of outer magnetic pole pieces 5 and 7. The pole pieces 1 and 5 are spaced to define an arcuate air gap 9, whereas the pole pieces 3 and 7 are spaced to define an arcuate air gap 11. These air gaps are symmetric about a shaft 13 which supports a coil assembly 15 for rotation with respect to the pole pieces about the axis of the shaft. Suitable bearings, such as the bearing 17, may be associated with the shaft for the purpose of mounting it for rotation about its axis. The coil assembly 15 has two sides 15a and 15b disposed, respectively, for movement through the air gaps 9 and 11 in response to rotation of the coil assembly about the axis of the shaft 13.

The inner pole pieces 1 and 3 are spaced apart sufficiently to define a passage 19 of sufficient size to permit passage of the coil assembly therethrough in a direction parallel to the shaft 13, or, if desired, in a direction transverse to the shaft 13. In order to remove the coil assembly from the associated pole pieces, it is merely necessary to rotate the coil assembly into alignment with the passage 19. The entire coil assembly then may be moved through the passage 19 without disturbing the pole pieces or any associated portions of the magnetic structure in any way.

A magnetomotive force may be established between the pole pieces 5 and 7 by any suitable source. In some cases, particularly if the source is a solenoid, it may be desirable to modify the instrument to compensate for solenoid error and this will be discussed below. It will be assumed that a permanent magnet is the source of magnetomotive force.

It will be noted that the pole pieces 5 and 7 are associated with a permanent magnet 21 which has its polarity indicated by conventional markings, N for north pole and S for south pole. These parts may be associated in any desired manner. For example, the pole pieces 5 and 7 may be brazed to a brass plate 23. This may be done before the arcuate surfaces of the outer pole pieces 5 and 7 which define the air gaps 9 and 11 are machined. In this way both surfaces may be made exactly symmetrical about a common axis. The permanent magnet 21 then may be secured to the plate 23 in any desired manner.

The inner pole pieces 1 and 3 are connected to each other through a magnetic connecting member 25. Conveniently, the inner pole pieces and the magnetic member 25 may be formed of similar magnetic laminations L which are secured to each other and to a brass supporting plate 27 by means of rivets 29. Each of the laminations may be punched to provide in an integral structure the inner pole pieces and the connecting member 25 as shown in Fig. 1. Finally the brass plate 27 may be secured to the outer pole piece 5 in any suitable manner as by brazing.

By inspection of Fig. 1, it will be observed that flux from the permanent magnet 21 passes in succession through the outer pole piece 5, the air gap 9, the inner pole piece 1, the connecting member 25, the inner pole piece 3, the air gap 11 and the outer pole piece 7 back to the permanent magnet 2. Consequently, the single source of magnetomotive force represented by the permanent magnet 21 supplies magnetic flux in series to both of the air gaps. The coil assembly 15 may be energized from a suitable source in accordance with a current to be measured in a conventional manner which will be discussed with reference to Fig. 2. When so energized, current flowing through the coil reacts with the magnetic field in the air gaps to apply a torque to the shaft 13. This torque may be opposed by a control spring in a manner which will be discussed with reference to Fig. 2.

Inasmuch as two inner pole pieces are employed in Fig. 1, the single coil 15 may be replaced by two coils each surrounding one of the inner pole pieces. Such coils 41A and 41B are shown in Fig. 2 in association with a pair of inner pole pieces 1a and 3a which correspond to the pole pieces 1 and 3 of Fig. 1. These coils 41A and 41B each have a side adjacent a shaft 43. One side of the coil 41A is disposed in an air gap 9a whereas the coil 41B has a side disposed in an air gap 11a. The air gaps 9a and 11a correspond respectively to the air gaps 9 and 11 of Fig. 1.

The coils 41A and 41B may be energized in parallel, in series or independently with proper polarities for applying cumulative or differential torques to the shaft 43 as desired.

This coil assembly is mounted for rotation by bearing screws 107 and 109 which are in threaded engagement with the plate 103 and the connecting element 101. These bearing screws receive in pivotal relationship the shaft 43 which supports the coil assembly 41. Connections to the coil assembly may be effected through spiral flexible conductor elements 79 and 81 which have their inner ends attached to hubs secured to the shaft 43 but which hubs are insulated from the shaft. The inner ends of the conductor elements are connected to the coil ends and the outer ends of the conductor elements may be connected to suitable conductors (one conductor 111 is shown) in order to connect the coil assembly across a source of an electrical quantity to be measured. The control spring 83 and the pointer 87 may be associated with the shaft 43 in a conventional manner. As previously explained, the coils 41A and 41B of the coil assembly 41 may be connected in such a manner that current flowing therethrough produces torques which are additively applied to the shaft 43.

As previously pointed out, it may be desirable in some cases to compensate for a solenoid error or effect. The solenoid effect may be discussed briefly with reference to Fig. 1. It will be noted that the magnetic structure associated with the coil assembly 15 is asymmetric with respect to the path of travel of the coil sides 15a and 15b. When the coil is in the position illustrated in Fig. 1, the magnetic reluctance of the associated magnetic structure to magnetic flux produced by current flowing through the coil assembly is a maximum. This is for the reason that the portions of the air gaps across which magnetic flux produced by such current passes are extremely small. When the coil assembly is rotated in a counterclockwise direction as viewed from the top of Fig. 1, the portions of the air gaps traversed by flux produced by a current flowing through the coil assembly increase and the magnetic reluctance offered to such magnetic flux by the associated magnetic structure consequently decreases. The coil assembly 15 seeks a position in which the magnetic reluctance of the associated magnetic structure to magnetic flux produced by current flowing through the coil assembly is a minimum. Consequently, the solenoid action effects the reading of the instrument.

In a permanent-magnet, moving-coil instrument, the magnetic field in the air gaps produced by the permanent magnet is substantially constant, and the effects of solenoid action need not be considered if the instrument is properly calibrated. However, in an electro-dynamic instrument the magnetic flux produced in the air gaps by current flowing through the fixed winding generally varies in accordance with a quantity to be measured. For this reason it is extremely difficult to compensate for solenoid action by calibration of the electro-dynamic instrument.

The coil assembly 41 of Fig. 2 already has been partially described. The coils 41A and 41B are assumed to be connected in series between the inner ends of two suitable spiral conductor springs 79 and 81 which are secured to the shaft 43 through suitable insulating bushings. A control spring 83 has its inner end secured to the shaft 43 and its outer end attached to the fixed or adjustable abutment 85 for biasing the shaft in a predetermined direction relative to the stator structure. A suitable pointer 87 may be attached to the shaft for rotation therewith across a scale (not shown).

In the embodiment of Fig. 2, solenoid action is substantially eliminated by dividing the magnetic structure into two parts having solenoid actions oppositely directed, as suggested in the aforesaid Lunas patent application. The instrument of Fig. 2 employs two outer pole pieces 5a and 7a which at one end are connected by an element 101. The pole pieces 5a and 7a and the element 101 may be formed of an integral magnetic structure such as soft steel or iron. The free ends of the pole pieces 5a and 7a may have attached thereto, as by means of machine screws, a bridging plate 103 of either magnetic or nonmagnetic material.

The coil assembly is mounted for rotation by bearing screws 107 and 109 which are in threaded engagement with the plate 103 and the connecting element 101. Connections to the coil assembly may be effected through the spiral flexible conductor elements 79 and 81 which have their outer ends connected to suitable conductors, such as the conductor 111.

Fig. 2 employs inner pole pieces 175 and 177 and a magnetic connecting element 179 which correspond, respectively, to the inner pole pieces 1 and 3 and the connecting element 25 of Fig. 1. However, the dimensions of the inner pole pieces 175 and 177 in a direction parallel to the shaft 43 is less than half the corresponding dimension of the coil assembly 41. A magnetic element 181 extends between the connecting element 179 and the pole piece 5a. Conveniently, the elements 179 and 181, together with the pole pieces 175 and 177, may be formed by punching the desired contour from unitary magnetic sheets to form laminations which are united by means of rivets 183.

In order to eliminate or substantially reduce solenoid action, two magnetic sections 185 and 187 are provided in Fig. 2. The magnetic section 185 includes the inner pole pieces 175 and 177, together with the elements 179 and 181. The magnetic section 187 is similar in construction to the magnetic section 185 but is reversed with respect thereto about an axis transverse to the shaft 43. As a result, the ends of the inner pole pieces 175 of the two magnetic sections are disposed adjacent opposite ends of the path of travel of the coil assembly 41. Consequently, when the plate 103 is removed and the control spring 83, together with the connectors 79 and 81 are disconnected from their fixed abutments, the coil assembly 41 may be removed from the associated magnetic structure.

In removing the coil assembly, it is first rotated into alignment with the passage between the inner pole pieces of the magnetic section 187. The coil assembly then is raised until the lower ends of the coils are between the two magnetic sections. These sections are spaced apart in the direction of the shaft 43 sufficiently to permit rotation of the coil ends therebetween. The coil assembly now is rotated into alignment with the passage between the inner pole pieces of the magnetic section 185 and withdrawn upwardly through the passage.

The fixed winding 189 surrounds both of the elements 181 associated with the two magnetic sections. When the current flowing through this winding produces a magnetic polarity indicated in Fig. 2 by N for north pole and S for south pole, the directions of flow of magnetic flux in the two air gaps between the inner and outer pole pieces are opposite to each other.

In instruments of the foregoing type, it is often desirable to provide shielding therefor. Such shielding may be provided, as shown, for example in Fig. 3. In Fig. 3, two inner pole pieces 191 and 193 are associated with two outer pole pieces 195 and 197. The pole pieces 191 and 197 are connected in parallel to one pole of the source of magnetomotive force 199. The pole pieces 193 and 195 are connected through magnetic connecting members 201, 203, 205 and 207 to the remaining pole of the source of magnetomotive force 199. Consequently, the two air gaps in Fig. 3 are connected in effect in parallel with respect to the source of magnetomotive force.

If the source of magnetomotive force 199 is a permanent magnet, the instrument of Fig. 3 may be employed in the manner discussed with reference to Fig. 1 with respect to a permanent magnet moving coil instrument. However, if the source of magnetomotive force 199 is a fixed winding having a magnetic core, it may be desirable to provide two magnetic structures similar to that illustrated in Fig. 3 but reversely associated with each other about the axis A—A in the manner discussed with reference to Fig. 2 for the purpose of reducing solenoid action.

It will be noted from Fig. 3 that the members 201, 203, 205 and 207 not only carry magnetic flux from the source of magnetomotive force 199 but they form a substantially continuous magnetic unipolar shield about the mechanism of the instrument. Such a shield often is desirable in measuring instruments.

A consideration of some instruments employing more complicated magnetic structures will show even more clearly the advantages resulting from the adoption of the principles herein discussed. In Fig. 4, an instrument is shown wherein a moving coil assembly 213 has two coils 215 and 217 which are mounted on a common shaft 219 for rotation about a common axis. The coil assembly 213 may be similar in construction to the coil assembly 41 discussed above, except for the fact that the coils 215 and 217 are displaced radially from the shaft 219 by a substantial distance.

The coil assembly 213 is associated with a magnetic structure 221 having two arcuate magnetic parts 223 and 225 which are spaced apart to define a passage 227 through which the coil assembly may be moved into and out of operative relationship relative to the magnetic structure. By inspection of Fig. 4, it will be noted that the magnetic parts 223 and 225 form, in effect, an annular magnetic core divided into two parts by the passage 227. The coil 215 surrounds or is linked with the magnetic part 223, whereas the coil 217 surrounds or is linked with the magnetic part 225.

The magnetic structure 221 is designed to provide two air gaps for two sides of each of the coils 215 and 217. For example, an outer pole piece 229 is spaced from the magnetic part 223 to define an arcuate air gap 231 within which a side 215a of the coil 215 is disposed for movement. An inner pole magnetic pole piece 233 is spaced from the magnetic part 223 to define an air gap 235 for reception of a side 215b of the coil 215.

In a somewhat similar manner, an outer magnetic pole piece 237 and an inner magnetic pole piece 239 are spaced from the magnetic part 225 to define two air gaps 241 and 243 for reception of two sides 217a and 217b of the coil 217. It will be noted that the air gaps 231, 235, 243 and 241 all are concentric about the axis of rotation of the coil assembly 213.

Magnetic fields may be established in the air gaps in any suitable manner. In order to apply additive torques to the coil 215, the pole pieces 229 and 233 should be of the same magnetic polarity relative to the magnetic part 223. For a similar reason, the pole pieces 237 and 239 should be of the same magnetic polarity relative to the magnetic part 225. Suitable directions for magnetic flux flow through the air gaps are indicated by arrows in the air gaps.

In the specific embodiment of Fig. 4, the inner magnetic pole piece 239 is connected to the outer magnetic pole piece 229 through a connecting magnetic member 245. Also the inner magnetic pole piece 233 is connected to the outer magnetic pole piece 237 through a magnetic connecting member 247. A magnetic ring 249 surrounds the portions of the instrument of Fig. 4 thus far specifically referred to.

For directing magnetic flux through the various air gaps a suitable source of magnetomotive force 251 is positioned between the outer pole piece 229 and the ring 249 and an additional source of magnetomotive force 253 is positioned between the outer magnetic pole piece 237 and the magnetic ring 249. In addition, magnetic connector members 255 and 257 connect the magnetic parts 223 and 225 respectively, to the magnetic ring 249. The sources of magnetomotive force 251 and 253 may be either permanent magnets or iron core solenoids, as desired. For example, the source of magnetomotive force 251 may include an iron core 251a surrounded by a winding 251b. If the magnetic core 251a is a permanent magnet, the winding 251b may be employed for magnetizing the permanent magnet. However, for the purpose of discussion, it will be assumed that the magnetic core 251a is formed of soft magnetic material and the winding 251b is relied on for establishing magnetic fields in the air gaps of the instruments. A similar comment applies to the source of magnetomotive force 253 which includes a magnetic core 253a and a winding 253b.

Suitable polarities for the sources of magnetomotive force are indicated by polarity markings N for north pole and S for south pole. With these polarities the directions of flow of magnetic flux in the air gaps are as indicated by arrows in Fig. 4. If the windings are energized by alternating currents, the polarities and directions of flux flow represent instantaneous polarities and directions of flux flow. It will be understood that the coils 215 and 217 may be connected in series or parallel to apply cumulative torques acting about the shaft 219. If desired, the coils 215 and 217 may be individually energized.

If the cores 251a and 253a are formed of soft magnetic material, the magnetic structure 221 may be constructed of a plurality of similar magnetic laminations united by suitable rivets 259. Each lamination would include portions of the magnetic parts 223 and 225, the four pole pieces, the members 245, 247, 255 and 257, the magnetic cores 251a and 253a and the magnetic ring 249. By punching the desired configuration shown clearly in Fig. 4 from sheets of soft magnetic material, accurate air gaps may be provided.

It will be noted that the various magnetic parts of the magnetic structure are clear of the passage 227. For this reason, the magnetic coil assembly 213 may be rotated in a counterclockwise direction as viewed in Fig. 4 into alignment with the passage 227. When the coil assembly is in such alignment, it may be removed through the passage in a direction parallel to the shaft 219 clear of the magnetic structure 221 without disturbing the magnetic structure.

If the instrument of Fig. 4 is to be employed as a wattmeter or varmeter, it may be desired to compensate the instrument for solenoid action in the manner discussed with reference to Figs. 2. Such compensation may be effected by constructing the magnetic structure 221 in two sections, each similar to the structure shown in Fig. 4 but reversed with respect to each other about the line A—A, and spaced from each other along the axis of the shaft 219. When so associated, the solenoid actions of the two sections with respect to each of the coils are opposed. Since such compensation has been clearly discussed above, further comment is believed unnecessary.

In Fig. 5, the magnetic part 223, together with the pole pieces 229 and 233 are shown in association with the coil 215. If desired, the air gaps for the coil 215 may be extended by providing one or more magnetic plates such as the plates 261 and 263. These plates project over the ends of the coil 215 but are spaced therefrom to provide air gaps for the ends of the coil. It will be noted that the pole pieces 229 and 233 and the plates 261 and 263 provide a resultant air gap which almost completely surrounds the magnetic part 223. Consequently, magnetic flux may be provided for a substantial portion of the coil 215. Although the coil 215 and the associated air gap may be of circular configuration, the rectangular configuration illustrated facilitates construction of the associated magnetic structure.

The plates 261 and 263 are constructed of magnetically soft material and may be similar in plan to the ring 249, but include projections 265 and 267 which are shown dotted in Fig. 4. These projections 265 and 267 overlie the magnetic parts 223 and 225.

A number of alternative systems are available for establishing magnetic fields for the coils 215 and 217. For example, in Figs. 6 and 7 a modification is illustrated which includes two magnetic parts 223a and 225a corresponding to the magnetic parts 223 and 225 of Fig. 4. In addition, Fig. 6 includes outer magnetic pole pieces 229a and 237a, together with inner magnetic pole pieces 233a and 239a which correspond, respectively, to the outer magnetic pole pieces 229 and 237 and the inner magnetic pole pieces 233 and 239 of Fig. 4.

The four pole pieces 229a, 237a, 223a and 239a all are magnetically connected together. For example, the outer magnetic pole pieces 229a and 237a are connected by means of a magnetic connector member 269 of soft magnetic material. The inner pole pieces 233a and 239a are connected to the member 269 by means of soft magnetic posts 271 and 273. These posts are positioned outside the path of rotation of the coil assembly 213. The various parts may be secured to each other in any suitable manner, as by soldering.

The magnetic parts 223a and 225a are connected by means of a magnetic connector member 275. Conveniently the parts 223a and 225a, together with the member 275, may be formed from laminations, each of which is punched from a sheet of soft magnetic material in accordance with the contour illustrated in Fig. 6. These laminations may be united by suitable rivets 277.

Magnetic fields may be established in the air gaps associated with the coils 215 and 217 by inserting a source of magnetomotive force such as a permanent magnet 279 between the outer pole piece 237a and the member 275. The permanent magnet may be soldered or otherwise secured to the associated pole piece and member. If the permanent magnet has the polarities indicated by the polarity marks N for north pole and S for south pole, the directions of flow of magnetic flux in the air gaps are as indicated by arrows in Fig. 6. It will be understood that the coils 215 and 217 may be suitably connected for energization to apply cumulative torques acting about the axis of the coil assembly. By inspection of Fig. 6, it will be noted that the passage 227 again is provided between the sets of pole pieces associated with the two coils 215 and 217. Consequently, the coil assembly 213 may be removed from operative relationship relative to the associated magnetic structure in the manner discussed with reference to Fig. 4.

If desired, the permanent magnet 279 may be replaced by a non-magnetic spacer such as a brass member. A source of magnetomotive force such as a permanent magnet, then may be inserted in the member 275 or in the member 269 to provide the desired magnetic fields for the coils 215 and 217. An instrument embodying these changes is illustrated in Fig. 8.

In Fig. 8, parts corresponding to the parts shown in Fig. 18 bear similar reference characters. However, in place of the magnetic member 275 a magnetic member 275a is provided which includes a source of magneto-motive force such as a permanent magnet 281. Also the member 269 of Fig. 6 is replaced in Fig. 8 by a member 269a having a source of magnetomotive force such as a permanent magnet 283 therein. These permanent magnets may be polarized to provide the magnetic flux shown by arrows in Fig. 9. Either or both of the permanent magnets 281 or 283 may be employed as desired. It will be noted that in Fig. 6 both of the magnetic parts 223a and 225a are of the same magnetic polarity, whereas in the instrument of Fig. 8, these parts are of opposite magnetic polarity. Consequently, the energization of one of the coils in Fig. 8 would be reversed from that utilized for the coil in the instrument of Fig. 6 to provide the desired cumulative torques acting about the axis of rotation of the coil assembly.

Referring again to Fig. 4, it should be noted that the sources of magnetomotive force 251 and 253 may be removed from their indicated positions and inserted in the magnetic connectors 255 and 257. The resulting instrument is shown in Fig. 9 wherein pole pieces 229b, 233b, 239b and 237b and the magnetic cores 223b and 225b correspond, respectively, to the pole pieces 229, 233, 239 and 237 and the cores 223 and 225. These pole pieces and cores in Fig. 9 cooperate to provide the air gaps 231, 235, 243 and 241 and the passage 27 for the coil assembly 213. A magnetic ring 249b is provided in Fig. 9 which corresponds to the ring 249 of Fig. 4.

The magnetic core 223b is connected to the magnetic ring 249b, through a suitable source of magnetomotive force 291. This source of magnetomotive force may be a permanent magnet 291a. However, for present purposes it will be assumed that the source of magnetomotive force comprises a magnetic core 291a surrounded by a fixed winding 291b. In a similar manner, the magnetic core 225b is connected to the magnetic ring through a source of magnetomotive force 293. It will be assumed that the magnetomotive forces have polarities as indicated by the polarity markings N for north pole and S for south pole. It will be observed that flux from the magnetomotive source 291 flows through the magnetic core 223b, across the air gaps 231 and 235 and returns to the magnetomotive source 291 through the pole pieces 229b and 233b. In a similar manner the source of magnetomotive force 293 supplies magnetic fields for the air gaps 241 and 243. The polarity markings in Fig. 9 are instantaneous polarities in the event that the instrument is employed for measuring alternating-current quantities.

If the moving coil assembly 213 and the fixed windings of the magnetomotive sources are energized by separate variable quantities, the instrument of Fig. 9 may be constructed to compensate for solenoid action in the manner discussed with reference to Fig. 2. With such construction, the magnetic structure 221b of Fig. 9 would be divided into two sections similar to that illustrated in Fig. 9, but reversed with respect to each other about the line B—B. These sections would be spaced from each other and associated with the same coils and windings in the manner discussed with reference to Fig. 2.

If the sources of magnetomotive force 291 and 293 are iron core solenoids, the entire magnetic structure illustrated in Fig. 9 may be constructed of unitary laminations punched from soft magnetic sheets and united to each other by means of suitable rivets 295. Each magnetic lamination would have the contour illustrated in Fig. 9 and would include portions of each pole piece, each magnetic core and the magnetic ring 249. By punching the desired configuration from sheets of magnetic material, accurate air gaps may be provided.

If the magnetic cores 291a and 293a are permanent magnets, the associated fixed windings may be employed for magnetizing the permanent magnets. If desired, the polarity of one of the permanent magnets such as the magnet 219a may be reversed. In such a case, the energization of the associated coil 215 should be reversed in order to provide cumulative torques acting around the shaft 219.

It will be noted that each of the coils 215 and 217 in Fig. 9 has a substantially independent magnetic circuit associated therewith. This may be shown more clearly by assuming that the magnetic structure 221b has a channel cut therethrough between the dotted lines 297 and 299. Such a channel clearly shows that the air gaps 231 and 235 are in effect connected in parallel for energization from the permanent magnet 291a. Similarly, the air gaps 241 and 243 are connected in parallel for energization from the source of magnetomotive force 293. If desired, if only one section is employed for the magnetic structure, the channel defined by the dotted lines 297 and 299 may be proportioned to permit removal of the coil assembly 213 therethrough from the passage 227 in a direction transverse to the shaft 219.

It will be observed that in each of the modifications a source of magnetomotive force supplies magnetic flux for at least two air gaps. In certain of the modifications, the source of magnetomotive force supplies magnetic flux for four air gaps.

In the foregoing manner, magnetic cores and pole pieces may be associated to provide as many air gaps as desired. In each case, it will be observed that the magnetic pole pieces and cores define a passage such as the passage 227 of Fig. 9 through which the coil assembly may be removed from operative position with reference to the associated magnetic structure and returned to the operative position. Each of the air gaps communicates with the passage in order to permit rotation of the coils from the passage into the associated air gaps.

Although the invention has been described with reference to certain specific embodiments thereof, numerous modifications are possible. Such modifications falling within the spirit of the invention are covered by the following claims.

I claim as my invention:

1. In an electrical instrument, a magnetic structure, a coil assembly, means mounting the coil assembly for rotation about an axis relative to the magnetic structure, said coil assembly having two coil sides displaced angularly about the axis and having portions intersecting a plane transverse to the axis, said magnetic structure comprising a first pair of pole pieces spaced to define an air gap within which a first one of the coil sides is disposed for rotation about the axis, a second pair of pole pieces spaced to define a second air gap within which a second one of the coil sides is disposed for rotation about the axis, and a single source of magnetomotive force having a first pole magnetically connected to a first one of the pole pieces, and having a second pole magnetically connected to a second one of the pole pieces, and means magnetically connecting the pole pieces other than the two last-named pole pieces for directing magnetic flux in succession through both of the air gaps, said pole pieces being spaced to define a passage communicating with the air gaps through which the coil may be inserted in operative position and removed from operative position relative to the magnetic structure without disturbing the magnetic structure.

2. In an electrical instrument, a magnetic structure, a coil assembly, means mounting the coil assembly for rotation about an axis relative to the magnetic structure, said coil assembly having two coil sides displaced angularly about the axis and having portions intersecting a plane transverse to the axis, said magnetic structure comprising a first pair of pole pieces spaced to define an air gap within which a first one of the coil sides is disposed for rotation about the axis, a second pair of pole pieces spaced to define a second air gap within which a second one of the coil sides is disposed for rotation about the axis, a single source of magnetomotive force, and magnetic means including a magnetic path substantially surrounding the pole pieces and establishing a circuit for magnetic flux derived from said single source for directing magnetic flux through both of the air gaps, said pole piece being spaced to define a passage communicating with the air gaps through which the coil may be inserted in operative position and removed from operative position relative to the magnetic structure without disturbing the magnetic structure, and said magnetic path establishing a magnetic shield for the instrument.

3. In an electrical instrument, a magnetic structure, a coil assembly, means mounting the coil assembly for rotation about an axis relative to the magnetic structure, said coil assembly having two coil sides displaced angularly about the axis and having portions intersecting a plane transverse to the axis, said magnetic structure comprising a pair of inner pole pieces, a pair of outer pole pieces, a first one of said inner pole pieces and a first one of said outer pole pieces being spaced to define an air gap for a first one of the coil sides, a second one of the inner pole pieces and a second one of the outer pole pieces being spaced to define an air gap for a second one of the coil sides, the first one of said inner pole pieces and the second one of said outer pole pieces being magnetically connected, and a single source of magnetomotive force interposed between the second inner pole piece and the first outer pole piece for supplying magnetic flux to both of the air gaps, said pole pieces being spaced to provide a passage communicating with the air gaps through which the coil may be inserted in operative position and removed from operative position relative to the magnetic structure without disturbing the magnetic structure.

4. In an electrical instrument, a magnetic structure, a coil assembly, means mounting the coil assembly for rotation about an axis relative to the magnetic structure, said coil assembly having two coil sides displaced angularly about the axis and having portions intersecting a plane transverse to the axis, said magnetic structure comprising a pair of inner pole pieces, a pair of outer pole pieces, a first one of said inner pole pieces and a first one of said outer pole pieces being spaced to define an air gap for a first one of the coil sides, a second one of the inner pole pieces and a second one of the outer pole pieces being spaced to define an air gap for a second one of the coil sides, the pole pieces of a first one of said pairs of pole pieces being magnetically connected and a single source of magnetomotive force being connected between the pole pieces of the second one of said pairs of pole pieces.

5. In an electrical instrument, a magnetic structure, a coil assembly, means mounting the coil assembly for rotation about an axis relative to the magnetic structure, said coil assembly having two coil sides displaced angularly about the axis and having portions intersecting a plane transverse to the axis, said magnetic structure comprising a pair of inner pole pieces, a pair of outer pole pieces, a first one of said inner pole pieces and a first one of said outer pole pieces being spaced to define an air gap for a first one of the coil sides, a second one of the inner pole pieces and a second one of the outer pole pieces being spaced to define an air gap for a second one of the coil sides, a single source of magnetomotive force connected between said pairs of pole pieces for supplying magnetic flux to both of the air gaps, said pole pieces being spaced to provide a passage communicating with the air gaps through which the coil may be inserted in operative position and removed from operative position relative to the magnetic structure without disturbing the magnetic structure.

6. In a moving coil electrical device, a magnetic structure including an annular magnetic core surrounding an axis, a pair of coils linked with the core and displaced radially from, and angularly about, a common portion of the axis, said magnetic core having a passage formed therein dividing the core into two arcuate core parts each associated with a separate one of the coils, said magnetic structure comprising separate magnetic pole piece means spaced from and substantially concentric with each of said core parts, each of said pole piece means including a portion inside the central opening of said annular core and a portion positioned outside said annular core for defining a magnetic field for a substantial portion of the associated coil, and means for directing magnetic flux through the magnetic structure for establishing said magnetic fields, and means mounting said coils for rotation relative to the magnetic structure about said axis, said magnetic structure having a channel including said passage proportioned to permit removal therethrough of the coils as a unit from operative position relative to the magnetic structure to a position external to the magnetic structure.

7. In a moving-coil electrical device, a magnetic structure, a rotor assembly comprising a pair of coils radially spaced from an axis and angularly spaced about the axis, each of the coils having two radially-spaced sides substantially parallel to the axis, means mounting the coils for rotation about said axis relative to the magnetic structure, said magnetic structure having an air gap for each of said two sides of each of said coils, means for establishing a magnetic field in each of said air gaps, and means connecting said coil sides for energization to produce additive torques between the rotor assembly and the magnetic structure.

8. In a moving-coil electrical device, a magnetic structure, a rotor assembly comprising a pair of coils radially spaced from an axis and angularly spaced about the axis, each of the coils having two radially-spaced sides substantially parallel to the axis, means mounting the coils for rotation about said axis relative to the magnetic structure, said magnetic structure having an air gap for each of said two sides of each of said coils, and means for establishing a magnetic field in each of said air gaps, said magnetic structure having a passage communicating with said air gaps through which the rotor assembly may be removed from operative position relative to the magnetic structure to a position external to the magnetic structure.

9. In a moving-coil electrical device, a magnetic structure, a coil unit mounted for rotation about an axis relative to the magnetic structure, said coil unit comprising a plurality of coil sides substantially spaced angularly from each other about a common portion of the axis and extending substantially parallel to said axis at different radial distances from said axis, said magnetic structure having a separate arcuate air gap for each of the coil sides, means for establishing magnetic fields in said air gaps, and means connecting the coil sides for energization to produce cumulative torques acting between the coil unit and the magnetic structure about said axis.

10. A device as claimed in claim 9 wherein the magnetic structure has a passage through which the coil unit may be moved from and into operative position relative to the magnetic structure without disturbing the magnetic structure.

11. A device as claimed in claim 10 wherein the coil unit comprises a pair of coils disposed substantially 180° from each other about said axis.

12. A device as claimed in claim 9 wherein said means includes a single source of magnetomotive force and magnetic connections for energizing said air gaps from said single source of magnetomotive force.

13. A device as claimed in claim 9 wherein said coil unit comprises a pair of coils displaced angularly from each other about said axis, to provide four coil sides substantially parallel to the axis, said magnetic structure having a separate arcuate air gap for each of the four coil sides, and wherein said first-named means comprises a source of magnetomotive force and magnetic means connecting at least two of the air gaps for energization in parallel from said source of magnetomotive force.

14. A device as claimed in claim 9 wherein the first-named means comprises a magnetomotive-force source means and magnetic connection means connecting the source means to supply magnetic flux to the air gaps, said magnetic connection means including a magnetic connector substantially surrounding the air gaps and the magnetomotive-force source means to serve both as a connector and as a magnetic shield.

15. In a moving-coil electrical instrument, a magnetic structure, a coil unit mounted for rotation about an axis relative to the magnetic structure, said coil unit having first and second pairs of coil sides all substantially parallel to said axis, said pairs being displaced from each other angularly about said axis, said magnetic structure comprising a first magnetic core extending between the coil sides of said first pair, a first outer pole piece and a first inner pole piece spaced from the magnetic core to define two arcuate air gaps for the coil sides of said first pair, a second magnetic core extending between the coil sides of said second pair, a second outer pole piece and a second inner pole piece spaced from the second magnetic core to define two arcuate air gaps for the coil sides of said second pair, said magnetic cores having free ends on corresponding sides of the respective pairs proportioned to permit simultaneous rotation of the pairs of coil sides about said axis over the free ends into a position clear of the magnetic cores.

16. An instrument as claimed in claim 15 wherein the coil unit includes two coils, each of the coils providing two of said coil sides, said magnetic structure including means for establishing magnetic fields in the air gaps and having a passage permitting withdrawal of the coil unit therethrough from said position.

17. An instrument as claimed in claim 15 in combination with a source of magnetomotive force, said magnetic structure including magnetic connection means for energizing at least two of the air gaps from the source of magnetomotive force.

18. An instrument as defined in claim 17 wherein said magnetic connections connect all of the air gaps for energization from the source of magnetomotive force.

19. An instrument as defined in claim 18 wherein said source has two poles, and wherein said magnetic connection means connect all of the pole pieces to one pole of the source and connect both of the magnetic cores to the remaining pole of the source.

20. An instrument as defined in claim 17 wherein the magnetic structure includes magnetic connections connecting the first pole pieces to the second pole pieces through a first magnetic path, and magnetic connections connecting the magnetic cores through a second magnetic path.

21. An instrument as defined in claim 20 wherein the source of magnetomotive force is disposed in one of said magnetic paths.

22. An instrument as defined in claim 15 wherein the magnetic structure includes first and second sources of magnetomotive force each having two poles, magnetic connection means connecting the first pole pieces to a first pole of the first source, magnetic connection means connecting the first magnetic core to a second pole of the first source, magnetic connection means connecting the second pole pieces to a first pole of the second source, magnetic connection means connecting the second magnetic core to a second pole of the second source, whereby said sources supply magnetic fields to all of the air gaps.

23. An instrument as defined in claim 15 wherein the magnetic structure includes first and second sources of magnetomotive force each having first and second poles, magnetic connection means connecting the first outer pole piece and the second inner pole piece to the first pole of the first source, magnetic connection means connecting the first inner pole piece and the second outer pole piece to the first pole of the second source, and magnetic connection means connecting the magnetic cores to the second poles of the sources, whereby said sources are effective for supplying magnetic fields to the air gaps.

24. In a moving-coil electrical instrument, a magnetic structure, a substantially rectangular coil, means mounting the coil for rotation about an axis relative to the magnetic structure, said coil having coil sides substantially parallel to the axis, and having coil ends substantially transverse to the axis, said coil being radially spaced from the axis, said magnetic structure comprising a magnetic core extending through the coil, a separate magnetic side pole piece adjacent each of the coil sides to establish with the magnetic core an air gap for the associated coil side, a magnetic end pole piece adjacent one of the coil ends to establish with the magnetic core an air gap for the associated coil end, the end pole piece being spaced from one of the side pole pieces to permit passage of the mounting means therebetween, and means for establishing a magnetic potential difference between the magnetic core and the pole pieces to establish magnetic fields in the air gaps, said magnetic core having the same magnetic polarity relative to the three pole pieces.

CECIL L. FREEDMAN.

REFERENCES CITED

The following references are of record in the file of this patent:

UNITED STATES PATENTS

| Number | Name | Date |
|---|---|---|
| 570,454 | Coleman | Nov. 3, 1896 |
| 591,241 | Shallengberger | Oct. 5, 1897 |
| 835,755 | Holden | Nov. 13, 1906 |
| 1,034,945 | Zander | Aug. 6, 1912 |
| 2,389,393 | Thomander | Nov. 20, 1945 |

FOREIGN PATENTS

| Number | Country | Date |
|---|---|---|
| 322,333 | France | Oct. 2, 1902 |
| 297,119 | Germany | Mar. 24, 1916 |
| 561,095 | Germany | Oct. 10, 1932 |